J. ZIMARIK.
TRACTOR.
APPLICATION FILED MAR. 1, 1919.
1,341,098.
Patented May 25, 1920.
2 SHEETS—SHEET 1.
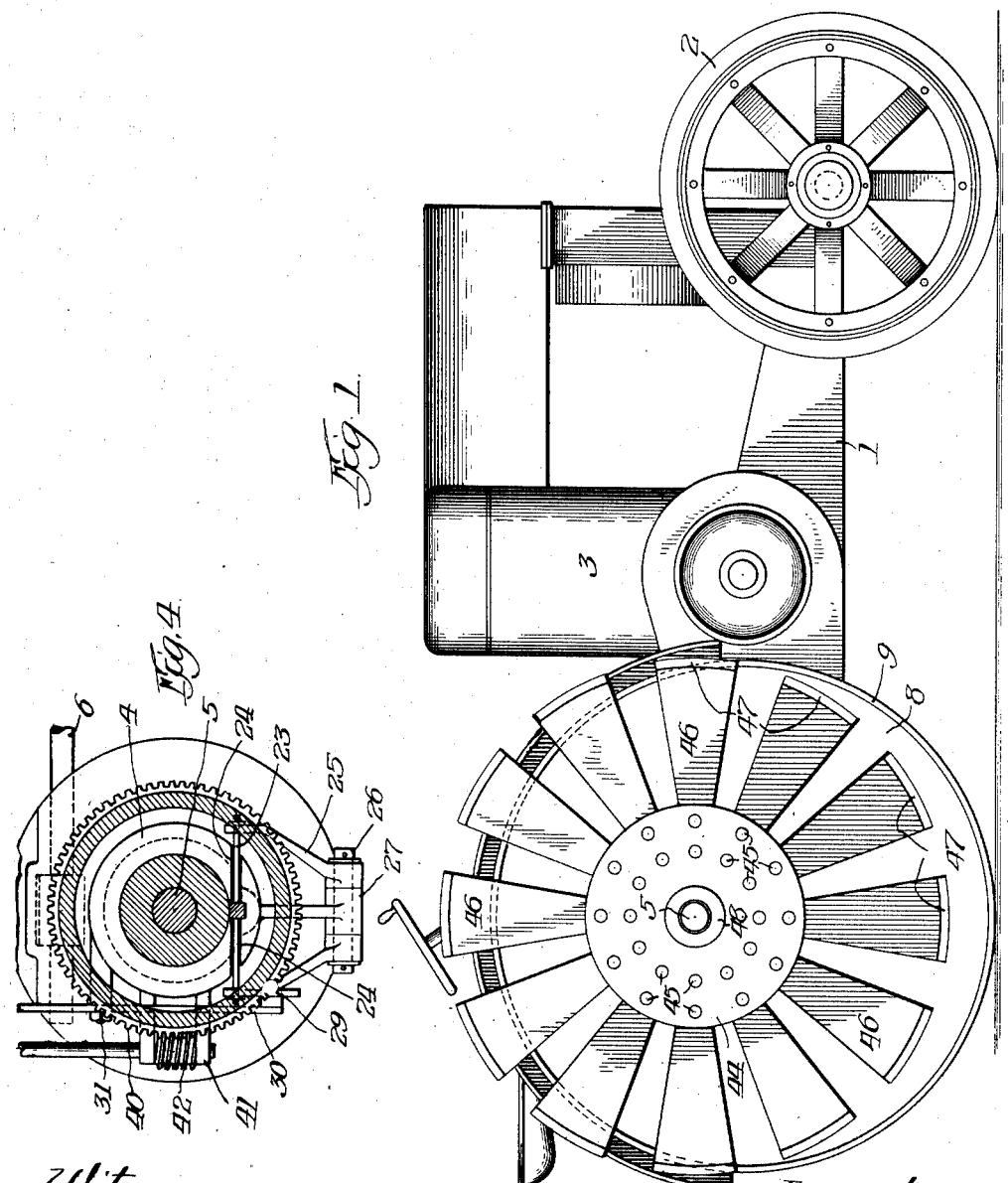
Inventor:
John Zimarik.
Witness:

J. ZIMARIK.
TRACTOR.
APPLICATION FILED MAR. 1, 1919.
1,341,098.
Patented May 25, 1920.
2 SHEETS—SHEET 2.
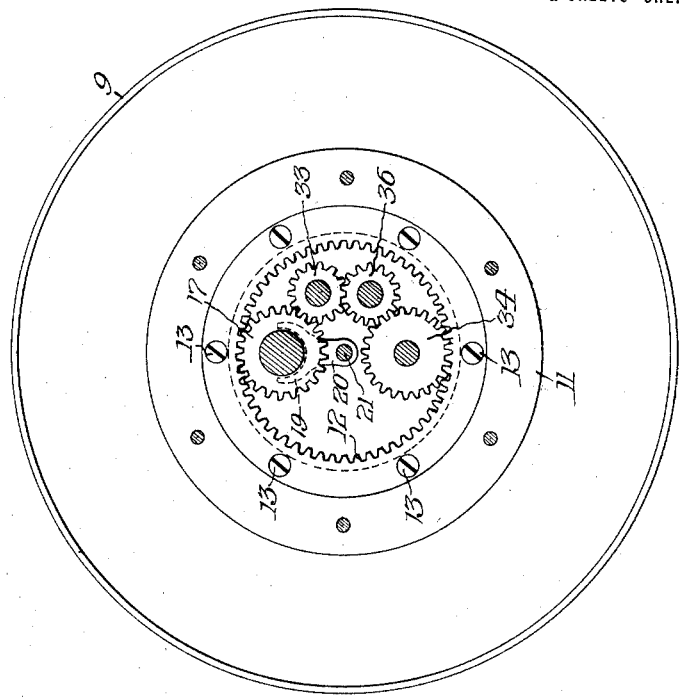
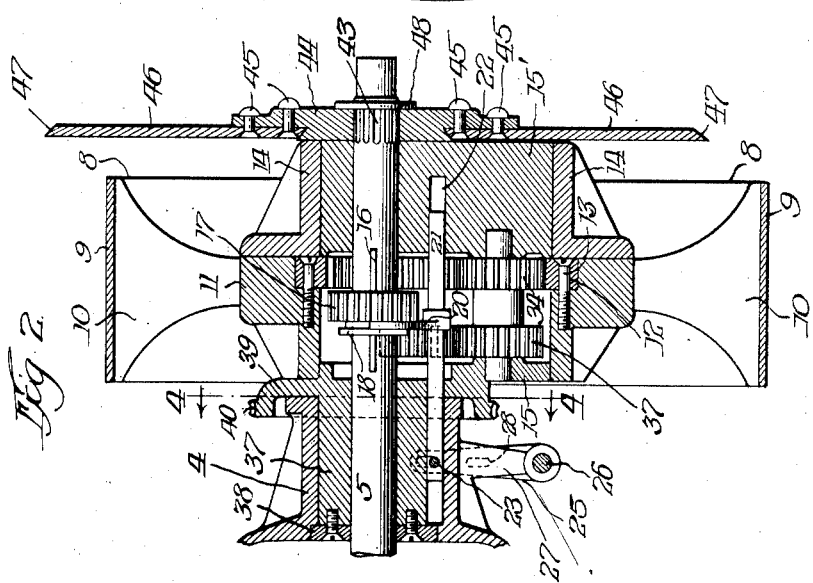
Witness:
Inventor
John Zimarik,
By
Atty

UNITED STATES PATENT OFFICE.

JOHN ZIMARIK, OF AKRON, OHIO.

TRACTOR.

1,341,098. Specification of Letters Patent. Patented May 25, 1920.

Application filed March 1, 1919. Serial No. 280,141.

*To all whom it may concern:*

Be it known that I, JOHN ZIMARIK, a citizen of the United States, residing at Akron, in the county of Summit, State of Ohio, have invented certain new and useful Improvements in Tractors, of which the following is a specification.

The object of this invention is to improve upon existing forms of tractors with a view of lightening the construction, rendering the tractor more efficient than any heretofore constructed. It is an object of this invention to provide a shiftable tractor member in the form of a disk carrying cutter blades, which tractor disk is mounted to be capable of adjustment with respect to the tractor wheel, in order to force the blades into the ground to a convenient depth and withdraw them without necessitating stopping the tractor. In addition to furnishing the tractive force, the bladed disks will cut paths for the furrows, it being designed that plows drawn by the tractor are arranged in line with the bladed disks.

In the form of construction designed by me, it is not essential to provide the main supporting and driving wheel with cleats or other tractor devices, for when it is necessary to have some tractive device, the rotating disk is brought around until the blades are projected into the ground. This form of device is superior to tractors now in general use as it enables the tractor to be built lightly, not depending on the weight of the vehicle to afford sufficient gripping action to propel it.

Another object of my invention is to construct a compact form of transmission contained within the wheel, which is light in weight, and especially adapted for use in a tractor, although it is not limited to such use.

Other objects and advantages will appear as the description proceeds, it being understood that this invention is not limited to such details as are shown, but is capable of a wide degree of modification or alteration without departing from the invention or losing any of the benefits thereof.

One form of the invention is shown in the drawings accompanying this application, in which:

Figure 1 is a side elevation of a tractor of any preferred form with my invention applied thereto.

Fig. 2 is a longitudinal vertical section through the wheel.

Fig. 3 is a transverse vertical section showing the driving gearing.

Fig. 4 is a section on the line 4—4 of Fig. 2.

The form of tractor to which my invention may be attached can be of any preferred type, one form being shown in Fig. 1, in which the main tractor frame is shown at 1, the front wheel at 2 and the engine at 3. The frame or casing is shown at 4 carrying the main driving shaft 5. The shaft is driven from the engine by a shaft 6, through any suitable differential gearing.

One of the rear wheels only is shown, being designated by the numeral 8, and it is understood that the wheel is duplicated on the other side of the tractor. It consists of a rim or periphery 9, which is preferably smooth faced, connected by radial spokes 10 to a hub 11. The hub is formed with an enlarged central recess and with an internal gear 12 set within and secured by a plurality of screws or bolts 13. On the other side of the hub is secured a cap plate 14 which may be removed for gaining access to the drive mechanism and the replacement of any parts.

In the recess of the hub is mounted a casting or housing, comprising an inner half 15 and outer half 15', on which the wheel is designed to rotate, any suitable form of bearing being interposed between the hub of the wheel and the housing. The main drive shaft is mounted eccentrically of the housing, as shown in Fig. 2, and the space between the two halves of the housing are designed to receive the driving gears, the shafts of which serve to tie the housing together.

The shaft 5 is provided with a feather 16, along which is adapted to be shifted a driving gear 17, one side being formed with a grooved sleeve 18 in which is fitted a collar 19 formed on an arm 20. The arm 20 is rotatably mounted on the shifting rod 21, which is located at the axis of the housing and at the axis of the wheel. The outer end of the shifter rod is received in a guiding recess 22 in the part 15', the inner end being designed to extend beyond the wheel, and within the housing at the inner side of the wheel, at which point, it carries a transverse pin 23 passing through slots 24 cut into the lower side of the casing 4. The transverse pin is received in slots in the ends of yoke 25 which is secured to a pin 26 pivotally mounted in a hanger 27 depending from the underside of the casing. Midway of one of the arms of the yoke is a slot 28 in which is located a pin 29 carried on the lower end of a lever 30 fulcrumed on the casing at 31, the upper end of the lever being designed to extend toward the driver's seat. By operation of the lever 30, it will be seen that the shift rod may be moved back and forth along the axis of the wheel moving the driving gear 17 for the purpose of stopping or changing the direction of travel.

As shown in Fig. 2, the driving gear is positioned at the neutral position. If now the shift rod is moved outwardly, the gear 17 will mesh with the internal gear 12 and the machine is designed to travel forward at this time. When, however, the shift rod is moved to the extreme inward point of its travel, the gearing is so designed that it will reverse the movement of the tractor.

The reverse action is obtained by means of a train of gearing, the first one of which is a gear 33 rotatably mounted in the housing at one side of the gear 12 and designed to mesh with the shiftable gear 17. The gear 33 meshes with an idler pinion 36 in mesh with another pinion 37. The shaft of this latter gear carries a further pinion 34 in mesh with the internal gear 12. The several gears described afford a simple and compact means of reversing the direction of the tractor or stopping it entirely, it being noted that the entire transmission is located within the housing which is in turn located centrally of the wheel. This forms a compact and easily operable device for the purpose and is one of the features of my invention.

The inner face of the half 15 of the housing is formed with an eccentric projection or boss 37ª, through which the shaft 5 projects, and which is received in the housing 4, the end of the projection carrying a thrust plate 38, larger than the boss, to prevent the housing and wheel from leaving the machine. At any point, shown herein where the projection or boss 37ª leaves the main portion of the housing at the side of the hub of the wheel, there is formed a flange ring 39, the outer edge of which is cut as a worm gear 40. On one side of the casing 4 is located a bracket 41, in which is mounted a worm 42 in mesh with the worm gear 40. The shaft of this latter worm gear is extended toward the driver's seat and is provided with a handle by which it may be rotated.

The end of the main drive shaft extends beyond the wheel and is hobbed as at 43, over which is fitted a disk 44 on the outer circumference of which are secured by bolts 45 a plurality of blades 46, the outer ends of which are sharpened to form cutting blades 47. The disk is secured in place by a hub cap 48.

The action of the portion of the device just described will be evident from the description which has gone before. When it is desired to project the blades into the ground for obtaining greater traction and for cutting the furrows ahead of the plows, the worm gear 42 is operated, rotating the housing inside of the hub of the wheel, and, as the boss or projection 37ª is located eccentrically of the wheel, the blades will be lowered into the ground. As the bladed disk is mounted to turn with the shaft 5, the tractor will be drawn along by their action.

Many of the details of the invention may be altered. The exact arrangement of the several driving gears may be altered and the form and arrangement of the worm gear which turns the housing about the eccentric hub may be changed without affecting the invention. Other means may be devised for shifting the gears and many other features may be varied.

I do not intend myself to be limited to the exact proportion of location of the parts, and within the scope of the invention many modifications are possible.

I claim:

1. Propelling mechanism for tractors and similar vehicles, comprising a supporting wheel, a disk, a plurality of blades rigidly attached thereto, and means for changing the relative position of the supporting wheel and the disk to move the blades into and out of operative position.

2. Propelling mechanism for tractors and similar vehicles, comprising a supporting wheel, a rigid traction member, and means for changing the relative position of the axes of the supporting wheel and the traction member, to move the latter into and out of operative position without interrupting the action of the former.

3. Propelling mechanism for tractors and similar vehicles comprising a wheel, a rigid traction disk comprising a plurality of blades carried by the wheel, the traction disk being bodily movable relative to the axis of the wheel so as to project the disk into the ground or withdraw it therefrom.

4. Propelling mechanism for tractors and similar vehicles, comprising a wheel, a driving shaft, a traction disk comprising a plurality of rigidly attached blades carried by the shaft, the said disk being movable above or below the axis of the wheel so as to project the disk into the ground or withdraw it therefrom.

5. Propelling mechanism for tractors and the like comprising a wheel, a traction disk comprising a plurality of rigidly attached blades carried by the shaft, the said disk being movable above or below the axis of the wheel so as to project the disk into the ground or withdraw it, and means for moving the disk without interrupting the revolution of the wheel.

6. A tractor construction, comprising a supporting wheel, a hub on the wheel, a housing within the hub, a traction disk eccentrically mounted on the housing, and means for rotating the housing to raise and lower the mounting of said disk.

7. A tractor construction, comprising a supporting wheel, a hub on the wheel, a housing within the hub, driving mechanism for said wheel within the housing, a traction wheel eccentrically mounted on the housing and means for rotating the housing within the hub to raise and lower the mounting of said disk.

8. A tractor construction comprising a supporting wheel, a hub on the wheel, a housing within the hub, an internal gear on the hub, driving gearing within said housing adapted to mesh with said internal gear, a traction wheel eccentrically mounted on the housing and means for rotating the housing within the hub to raise and lower the traction wheel.

9. A tractor construction comprising a main drive shaft, a supporting wheel, a housing, an eccentric bearing for said shaft in the housing, the supporting wheel being rotatably mounted on said housing, driving connections from said shaft to the wheel, a traction disk secured on said shaft and means for rotating the housing to raise and lower the traction disk.

10. A tractor comprising a main drive shaft, a supporting wheel, a housing, an eccentric bearing for said shaft in the housing, the supporting wheel being rotatably mounted on said housing, a pinion on said shaft, reversible gearing engageable by said pinion, a traction disk secured on said shaft and means for rotating the housing to raise and lower the traction disk.

11. A tractor comprising a main drive shaft, a supporting wheel, a housing, an eccentric bearing for said shaft in the housing, the supporting wheel being rotatably mounted on said housing, a pinion feathered on said shaft, a shifter rod for said pinion located at the center of the housing, reversible gearing engageable by said pinion, a traction disk secured on said shaft and means for rotating the housing to raise and lower the traction disk.

12. In a tractor construction, a tractor frame, a housing, an eccentric projection at one side of the housing rotatably mounted in the frame, a tractor disk carried by said housing, a wheel rotatably mounted on the housing, and means to shift the housing about the eccentric projection.

13. In a tractor construction, a tractor frame, a housing, an eccentric projection at one side of the housing rotatably mounted in the frame, a tractor disk carried by said housing, a wheel rotatably mounted on the housing, and means to shift the housing about the eccentric projection, and driving mechanism for the wheel located within the housing.

14. In a tractor construction, a tractor frame, a housing, an eccentric projection at one side of the housing rotatably mounted in the frame, a drive shaft passed through the projection and housing, a traction disk on the shaft, a wheel rotatably mounted on the housing, and means to shift the housing about the eccentric projection.

15. In a tractor construction, a tractor frame, a housing, an eccentric projection at one side of the housing rotatably mounted in the frame, a drive shaft passed through the projection and housing, a traction disk on the shaft, a wheel rotatably mounted on the housing, means to shift the housing about the eccentric projection, and driving mechanism for the wheel located within the housing.

16. In a tractor construction, a tractor frame, a housing, an eccentric projection at one side of the housing rotatably mounted in the frame, a drive shaft passed through the projection and housing, a traction disk on the shaft, a wheel rotatably mounted on the housing, a pinion on said shaft reversible driving gearing from the pinion to the wheel, a shifter rod for said gearing located at the center of the housing, and means to shift the housing about the eccentric projection.

17. In a tractor construction a supporting wheel and a traction disk, blades rigidly secured to the disk, and means for raising and lowering said disk with respect to the wheel.

18. In a tractor construction, a supporting wheel, a traction disk, means for moving said traction disk to force the same into the ground or remove it therefrom without changing the outer circumference of the disk.

19. In a wheel structure for traction or the like, a hub, an internal gear secured to said hub, a drive shaft eccentric to said wheel, a pinion on said drive shaft, reversing gearing in mesh with the internal gear, and means for moving the pinion to mesh with the internal gear directly or with the reversing gearing.

20. In a wheel structure for traction or the like, a gear secured to the wheel, a drive shaft eccentric to said wheel, a pinion on the shaft, reversing gearing in mesh with the said gear and means for connecting the pinion with the gear directly or the reversing gearing.

21. In a wheel structure for traction or the like, a gear secured to the wheel, a drive shaft eccentric to said wheel, a pinion on the shaft, reversing gearing in mesh with the said gear, and means for sliding the pinion on the shaft to engage it with the said gear or the said reversing gearing.

22. In a tractor construction, the combination of a supporting wheel, a disk carried by the wheel, a plurality of blades secured to the disk, and means for raising and lowering the disk with respect to the wheel without changing the radial arrangement of the blades.

23. In a tractor construction, the combination of a supporting wheel, a bladed disk carried by the wheel, means for raising and lowering the entire disk with respect to the wheel, and a common driving shaft for the wheel and disk.

24. In a tractor construction, a smooth faced supporting wheel, a tractor disk comprising a plurality of blades separate from the wheel and located at the side of the wheel, and means for bodily raising or lowering said entire disk to obtain traction.

25. In a tractor construction, a smooth faced supporting wheel, a rigid bladed disk at one side of the wheel, means for raising and lowering the disk, and a common driving shaft for the wheel and the disk.

26. In a tractor construction, a smooth faced supporting wheel, a rigid traction disk composed of a plurality of sharpened blades and means for raising and lowering the disk without changing the circumference of the blades.

27. In a tractor construction, a smooth faced supporting wheel, a shaft for driving said wheel, a traction disk secured to the shaft, said disk being composed of a plurality of rigid blades and means for raising and lowering the disk.

JOHN ZIMARIK.